Nov. 24, 1953 M. FOX 2,660,462
LOAD BEARING PIVOTED MEMBER FOR FURNITURE MECHANISM
Filed May 13, 1950 2 Sheets-Sheet 1
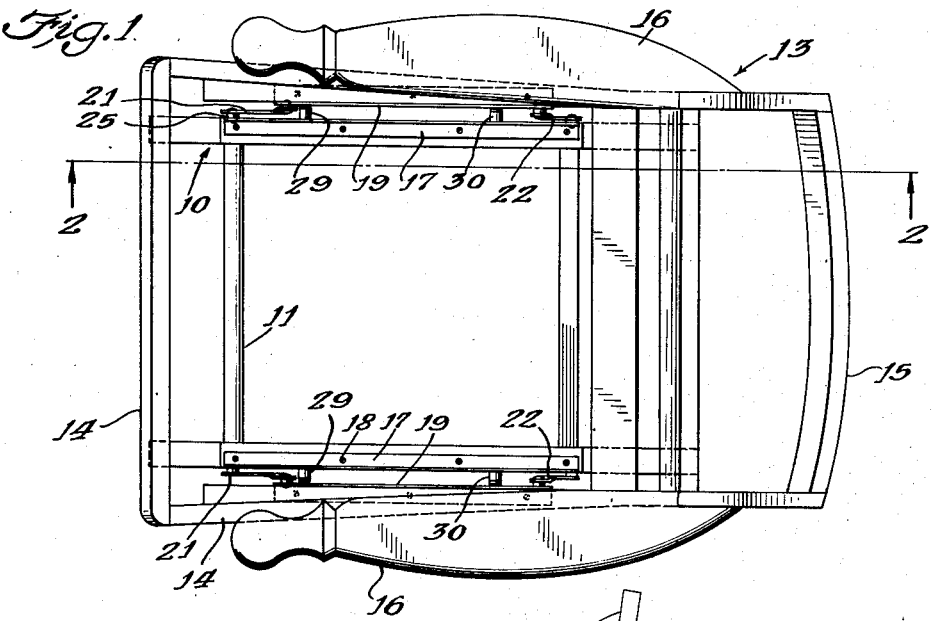
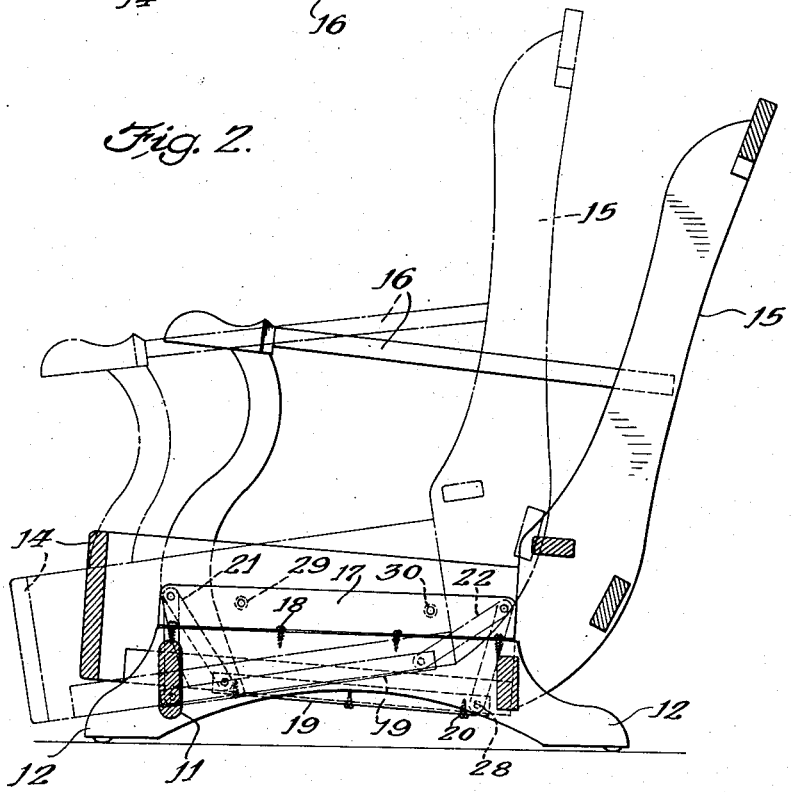
Inventor:
Martin Fox
By:
Schroeder, Merriam, Hofgren & Brady
Attorneys

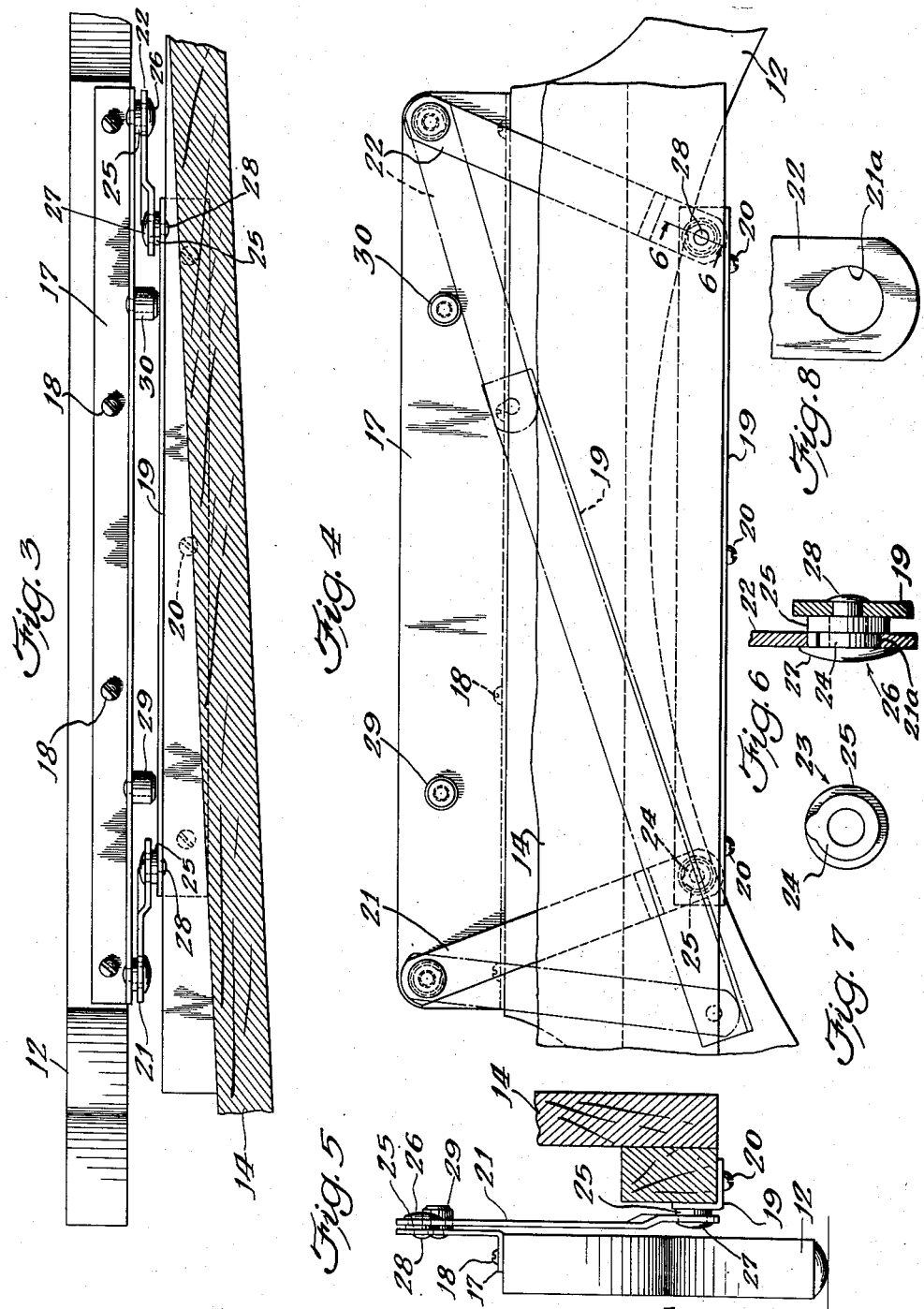

Patented Nov. 24, 1953

2,660,462

UNITED STATES PATENT OFFICE 2,660,462

LOAD BEARING PIVOTED MEMBER FOR FURNITURE MECHANISM

Martin Fox, Chicago, Ill., assignor to The Seng Company, a corporation of Illinois Application May 13, 1950, Serial No. 161,839

2 Claims. (Cl. 287—101)

This invention relates to an improvement in load-bearing pivoted members for furniture mechanism and in particular it relates to a link or lever which has a nylon bushing at its load-bearing pivot.

The primary object of the invention is to provide a furniture mechanism which is simple, rugged, noiseless, and requires no lubrication.

A further object is to afford a wide bearing surface for the load bearing pivots of a furniture mechanism by keying a nylon bushing into the load-bearing member so that the bushing rotates on the pivot pin of a journal member, rather than the member on the bushing.

For convenience of illustration the improved pivoted member is shown in the drawings incorporated into the linkage of a glider chair, although it is apparent that it may be used to advantage in any furniture hardware which includes a link or lever which is a load-bearing member.

The invention as incorporated in such a glider chair, is shown in the accompanying drawings, in which:

Figure 1 is a plan view of a glider chair, to show a typical application of the invention; Fig. 2 is a section taken as indicated along the line 2—2 of Fig. 1 with the chair seat and back shown in full lines in normal position, and in broken lines in a forwardly tilted position; Fig. 3 is an enlarged fragmentary plan view of the left side mechanism of the chair shown in Fig. 1, with part of the seat frame shown in section; Fig. 4 is a fragmentary side elevation similar to Fig. 3; Fig. 5 is a front elevation viewing Fig. 3 from the left, with the seat frame shown in section; Fig. 6 is a section taken as illustrated along the line 6—6 of Fig. 4; Fig. 7 is a plan view of the nylon bushing of the invention; and Fig. 8 is a fragmentary plan view of one of the load bearing arms, or links, or the mechanism showing the non-circular aperture to accommodate the bushing of Fig. 7.

Referring to the drawings in greater detail, and with particular reference to Figs. 1 and 2, the glider chair to which the invention is applied for purposes of illustration comprises a base portion, indicated generally at 10, said base portion including a frame 11 and feet 12. A seat portion, indicated generally at 13 includes a frame 14, back 15 and arms 16. The frame 14 and back 15 support any desired type of upholstery in the conventional manner.

As best seen in Figs. 3, 4 and 5 the seat portion 13 is secured to the base portion 10 by means of links which permit it to have a swinging or gliding action. The linkage mechanism includes base attaching plates 17 which are secured to the base frame 11 by means of screws 18, and seat attaching plates 19 which are secured to the seat frame by means of screws 20. Front links 21 and rear links 22 connect the front and rear, respectively of the seat attaching plates 19 to the base attaching plates 17; so that the seat portion is secured to the base for swinging movement, as previously pointed out. Stops 29 and 30 are provided on the base attaching plates 17 in order to prevent over-swinging of the seat portion upon its links.

The mechanism as heretofore described is conventional and the invention is in the form of the bearings and pivots between the attaching plates and the links. For convenience the following description of the bearings and pivots will describe a single front link 21, since the bearings and pivots of all links are alike. As best seen in Figs. 6, 7 and 8, the link 21 is provided with a non-circular aperture 21a to receive a nylon bushing, indicated generally at 23. The bushing 23 has an insert portion 24 which is complementary in shape to the aperture 21a so that it may be inserted in said aperture and secured against rotation by interlocking of the non-circular aperture and the insert portion 24 of the bushing. An integral flange portion 25 overlies the periphery of the aperture 21a in the link.

A rivet 26 extends through the nylon bushing 23 and has a large head 27 which abuts against the face of the link 21 and has a foot 28 crimped over the edge of an aperture in the seat attaching plate 19. The rivet 26 and seat attaching plate 19 combine to provide a metal journal member having a pin which extends through the aperture in the bushing and having a portion which abuts against the flange 25 of the bushing. The form of the bushing herein described is such that the bushing acts as an integral part of the load bearing arm, or link 21, and the combination of the insert portion 24 and flange portion 25 provides a relatively long bearing surface for the shank of the rivet 26. Similarly, the flange 25 provides a bearing surface of substantial area where it is in wearing contact with the face of the seat attaching plate 19. Thus, the combination provides a rugged and wear resistant pivot member, and the use of a nylon bushing eliminates the need for lubrication of the moving parts.

The foregoing detailed description is given for clearness of understanding only, and no unnecessary limitations should be understood therefrom, for some modifications will be obvious to those skilled in the art.

I claim:

1. In a furniture mechanism: a load bearing arm provided with a non-circular aperture; a nylon bushing having a non-circular hollow stem filling said aperture and a flange overlying a face of the arm to provide a bearing surface; a member having a portion overlying said flange; and a pivot pin secured to said member and extending through said hollow stem, said pivot pin being rotatable in said bushing and having a flanged head to secure said member and said arm rotatably together.

2. The device of claim 1 in which the pin is a rivet which extends through an aperture in the member and is crimped over to secure it to said member.

MARTIN FOX.

References Cited in the file of this patent

UNITED STATES PATENTS

| Number | Name | Date |
| --- | --- | --- |
| 345,398 | Walter | July 13, 1886 |
| 489,258 | Marks | Jan. 3, 1893 |
| 825,329 | Lemp | July 10, 1906 |
| 862,188 | Ohl | Aug. 6, 1907 |
| 1,362,122 | Rhoades | Dec. 14, 1920 |
| 1,997,450 | Mitchell | Oct. 16, 1934 |
| 2,246,086 | Austin | June 17, 1941 |
| 2,492,547 | Willard | Dec. 27, 1949 |